Figure 1:
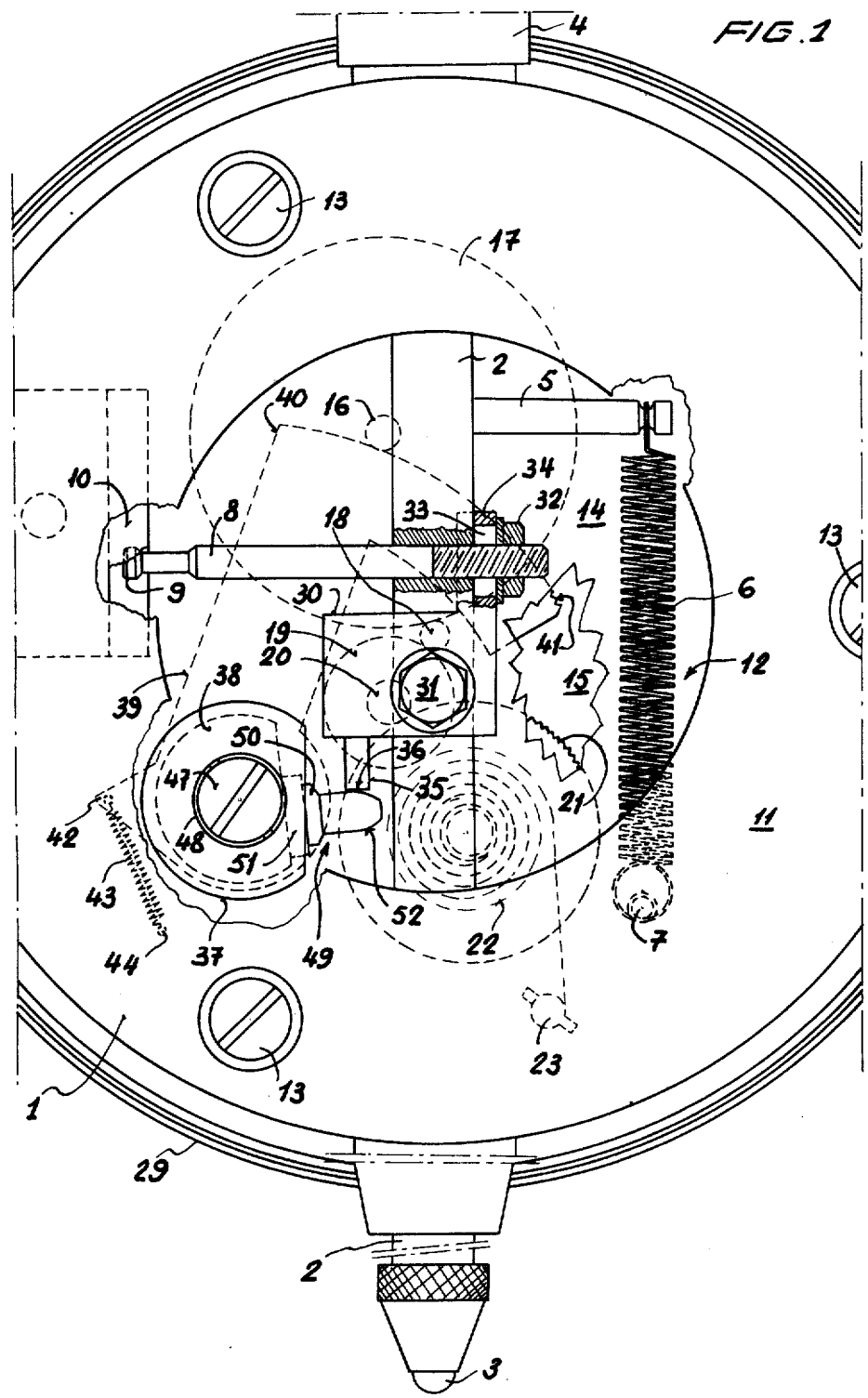

United States Patent [19]

Risse et al.

[11] 3,937,090

[45] Feb. 10, 1976

[54] MEASURING INSTRUMENT

[75] Inventors: Jean-Claude Risse, Prangins; Bruno Hardegger, Monaltorf, both of Switzerland

[73] Assignee: Tesa S.A., Renens, Switzerland

[22] Filed: May 15, 1974

[21] Appl. No.: 470,067

[30] Foreign Application Priority Data
June 13, 1973 Switzerland.................. 8518/73

[52] U.S. Cl.................. 74/55; 116/29; 33/172 R
[51] Int. Cl.².................................. F16H 25/08
[58] Field of Search .......... 74/50, 55, 56; 33/172 R; 116/129 R; 73/432 A

[56] References Cited
UNITED STATES PATENTS

| | | | |
|---|---|---|---|
| 2,832,151 | 4/1958 | Emery | 116/129 |
| 2,900,732 | 8/1959 | Abramson | 33/172 R |
| 3,034,363 | 5/1962 | Vogel | 74/55 |
| 3,110,284 | 11/1963 | Napier | 116/129 R |
| 3,337,963 | 8/1967 | Tseitlin et al. | 33/172 A |
| 3,610,057 | 10/1971 | Repen | 74/55 |
| 3,699,473 | 10/1972 | Paul | 33/172 R |
| 3,793,902 | 2/1974 | Grantham | 74/50 |

Primary Examiner—Samuel Scott
Assistant Examiner—Wesley S. Ratliff, Jr.
Attorney, Agent, or Firm—Anthony J. Casella

[57] ABSTRACT

This invention relates to a measuring instrument in which the rectilinear displacement of a feeler rod is transmitted to a geared multiplier mechanism by means of a rotating element such as an arm carrying a toothed sector meshing with a first toothed wheel of the multiplier mechanism, the transmission of movement between the feeler rod and the rotating element being effected by an abutment carried by the feeler rod and in contact with the profile of a cam carried by the rotating element.

4 Claims, 4 Drawing Figures

MEASURING INSTRUMENT

The present invention concerns measuring instruments in which the rectilinear movement of a feeler rod is transmitted to a geared multiplier mechanism.

Such instruments (the so-called "clock" gauges) in which the movement of the feeler rod is transmitted to the multiplier mechanism by means of a rotating element actuating a lever carrying a toothed sector meshing with a first toothed wheel of the multiplier mechanism. In these instruments, the transmission of movement between the feeler rod and the lever carrying the toothed sector is effected by an abutment integral with the feeler rod and presenting a stop or actuating surface approximately perpendicular to the axis of the feeler rod, this stop resting against a cam permanently fixed to the lever carrying the toothed sector, disposed parallel to the axis of rotation of the latter and presenting a transverse profile which is an involute of the circle.

This arrangement provides a drive between the feeler rod and the lever carrying the toothed sector which has a meshing or hold angle which is approximately zero over the whole range of movement of the feeler rod which tends to suppress errors which are produced in instruments in which the transmission between the feeler rod and the rotating element is effected by a direct drive such as a toothed rack or gear on the feeler rod. When the feeler rod develops radial play such as takes place after extensive use, then the transmission ratio between the feeler rod and the associated rotating element is no longer an exact function of the interpenetration of the teeth of the feeler rod and the rotating element. This error does not occur when a cam is driven by a stop on the feeler rod. On the other hand, it is not possible to modify the conditions of this transmission and consequently the sensitivity of the system without modifying the angle or hold between the feeler rod and the arm carrying the toothed sector, and this may introduce a systematic error. In practice, due to the position of the fixed cam and of the contact between the stop of the abutment integral with the feeler rod, it is necessary to modify the inclination of the stop to modify the transmission ratio between the feeler rod and the arm carrying the toothed sector; as a consequence of this modification in the inclination, the hold angle varies.

According to the present invention there is therefore provided a measuring instrument in which the rectilinear displacement of a feeler rod is transmited to a geared multiplier mechanism by means of a rotating element such as an arm carrying a toothed sector meshing with a first toothed wheel of the multiplier mechanism, the transmission of movement between the feeler rod and the rotating element being effected by an abutment carried by the feeler rod and in contact with the profile of a cam carried by the element, the cam profile being an involute of the circle, wherein the abutment comprises a bearing surface always perpendicular to the axis of the feeler rod this abutment being held against a cam of revolution the longitudinal profile of which is an involute of the circle and the longitudinal axis of which is perpendicular to the axis of rotation of the rotating element, the cam of revolution being axially movable, so that the angle of engagement between the cam and the abutment surface is always equal to zero for all axial positions of the cam.

Figure 2:
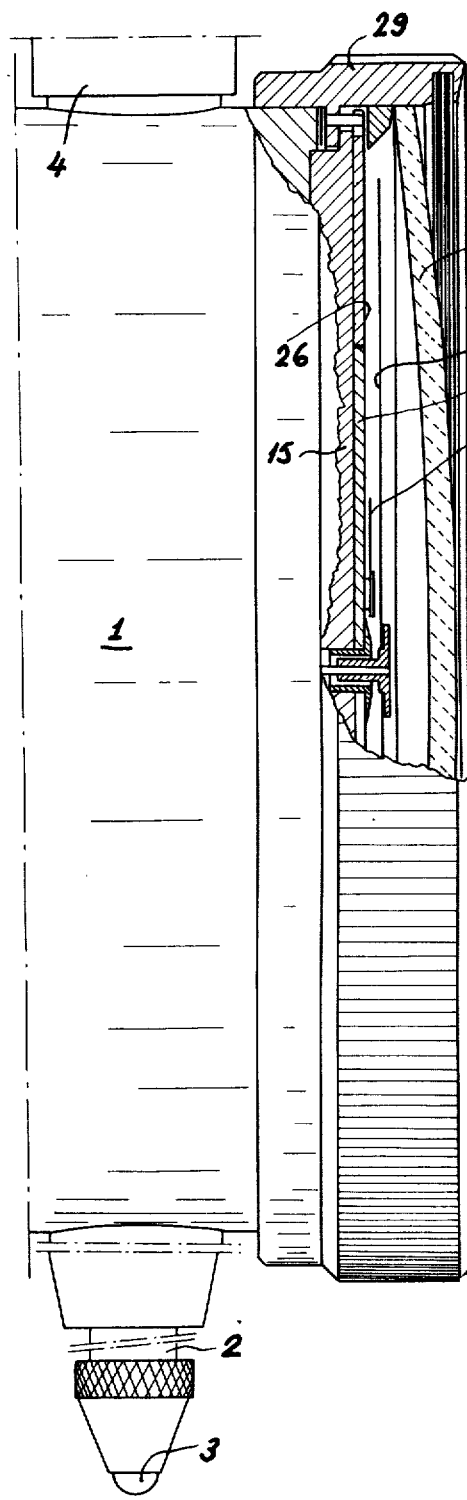
Figure 3:
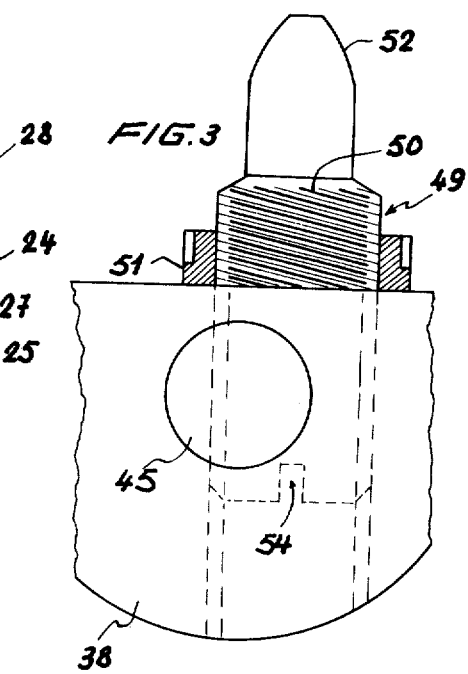
Figure 4:
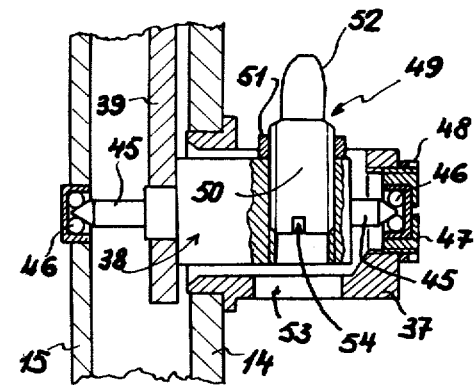

The accompanying drawings show one embodiment of the invention. In the drawings, FIG. 1 is a part plan view of a gauge in partial section of a comparator in accordance with the invention;
FIG. 2 is a part-sectioned side view;
FIG. 3 is a plan of a detail on a large scale; and
FIG. 4 is an enlarged section of a further detail.

The gauge shown comprises a casing 1 in which slides a feeler rod 2. The rod passes through the case, and carries a feeler or measuring tip 3 at one end and a boss 4 at the other, these two limiting the axial movement of the rod. There is a first transverse finger 5 fixed on the rod 2 on which one end of a tension spring 6 is hooked; the other end is hooked on a pin 7 integral with the casing 1; this spring continuously urging the rod 2 downwardly. A second finger 8 screwed transversely in the rod 2 extends into the casing 1 and its free end 9 slides in a guide 10 provided in the casing 1 so that the rod 2 cannot turn on its own axis. Thus, the rod 2 is movable axially but is angularly fixed. The base 11 of the casing comprises an access opening 12 and the hole is covered by a closure plate (not shown).

The casing 1 is connected by means of a screw 13 to two superposed plates 14 and 15 betweenn which there is mounted a multiplier mechanism comprising a first pinion 16 though coupled to and co-axial with a toothed wheel 17 meshing with a second pinion 18. This meshes with a toothed wheel 19 co-axial with and coupled to a pinion 20 meshing with a toothed wheel 21 subject to the action of a spiral return spring 22 fixed by one of its ends to a pin 23 fixed in the plate 15. The spindles of the pinion 18 and of the toothed wheel 21 of the multiplier mechanism entrain respectively two pointers 24 and 25 (FIG. 2), the pointers over dials 26 and 27 provided on the plate 15, the dials being covered by a glass 28 maintained in position by a rim 29 mounted on the casing 1. These structures are known and will not be described in any more detail.

On the rod 2 is fastened a block 30 with a projection 34 in which there is an elongated opening 33 parallel to the axis of the rod and surrounding the threaded end of the finger 8.

The block 30 can thus be displaced axially on the rod 2 and its maintenance in place is ensured by a lock screw 31 abuting against the rod 2, and by a nut 32 on the threaded end of the finger 8 and squeezing the projection 34 against the rod 2. The block 30 carries an abutment 35 having a bearing surface 36 exactly perpendicular to the axis of the rod 2. Since the abutment 35 is integral with the block 30 and this is fixed to the rod 2, all axial displacement of the rod produces an equal displacement of the abutment 35 and its bearing surface 36, which is always perpendicular to the axis of the rod 2.

A casing 37 (FIGS. 1 and 4) is fixed on the plate 14, traversing it, in the interior of which there is rotatably mounted a support 38 with two coaxial trunnions 45 (FIG. 4) respectively engaging in two ball bearings 46, one in the plate 15 and the other in the case 37. The shell of the bearing 46 is fixed in the plate 15 whilst the shell carried by the case 37 is mounted in a race 47 adjustably screwed into the wall of the case 37 and having a lock nut 48. The axes of the trunnions 45 are perpendicular to the axis of the feeler rod 2. Rotation of the support rotates an arm 39, fixed to the support and coaxial thereto. The arm extends between the plates 14 and 15 and on end 40 carries a toothed sector 41 centered on the axis of rotation of the support 38 and meshing with the first pinion 16 of the multiplier mechanism.

The lever 39 carries a spur 42 to which is fixed a return spring 43 hooked to a pin 44 fixed on the plate 14.

The support 38 carries a feeler 49 comprising a threaded base 50 screwed into the support 38 and maintained in place by a lock nut 51; the feeler has a cam 52 formed as a surface of revolution the generatrix or longitudinal profile of which is an involute of the circle. The base 50 and the cam 52 are coaxial and their longitudinal axis is perpendicular to the axis of rotation of the support 38. The cam profile 52 comes into contact with the bearing surface 36 of the abutment 35 and due to the action of the return spring 43 operating on the spur 42 of the arm 39 which is carried by the support 38, this contact is maintained when the feeler rod 2 is axially displaced.

When the feeler rod 2 is axially displaced against the action of the spring 6, the abutment 35 is simultaneously displaced and the cam 52 which is urged against it by the spring 43 follows the movement. This causes the arm 39 to pivot, the toothed sector 41 meanwhile driving the gear train 16-17-18-19-20-21 to rotate the pointers 24 and 25. When the rod of the feeler 2 is released, it is moved downwards by the spring 6, the abutment 35 follows and pushes the cam 52 back, which transmits the movement to the rest of the system, this movement being in the reverse direction to the preceding one.

Due to the fact that transmission of movement between the feeler rod 2 (rectilinear movement) and the arm 39 carrying the toothed sector 41 (circular movement) is effected by a surface which is always perpendicular to the axis of the feeler rod and in contact with a cam profile which is an involute of the circle, this transmission has a zero meshing angle. If it is necessary to modify the transmission conditions and in consequence the sensitivity of the system, the lock nut 51 is loosened so that the base 50 can be screwed in or out. For this purpose an opening 53 is provided in the wall of the case 37. This permits the introduction of a screwdriver in the slot 54 of the threaded base 50. In screwing or unscrewing the base 50 in the support 38 the cam 52 is axially displaced in the support 38 without modifying the angle of mesh or hold, which remains equal to zero because of the fact that the cam is a surface of revolution and there is thus always an involute of the circle profile of such a surface in contact with the bearing face which is perpendicular to the axis of the feeler rod.

It is possible to replace the threaded base 50 by a base sliding in the support 38 in which it is locked, for example, by a transverse screw.

What we claim is:

1. A measuring instrument in which the rectilinear displacement of a feeler rod is transmitted to a geared multiplier mechanism by means of a rotating element such as an arm carrying a toothed sector meshing with a first toothed wheel of the multiplier mechanism, the transmission of movement between the feeler rod and the rotating element being effected by an abutment carried by the feeler rod and in contact with the profile of a cam carried by the element the cam profile being an involute of the circle, said cam having a base which can slide in a support coaxial with said rotating element and fixed to it, and wherein the abutment comprises a bearing surface always perpendicular to the axis of the feeler rod this abutment being held against a cam of revolution the longitudinal profile of which is an involute of the circle and the longitudinaal axis of which is perpendicular to the axis of rotation of the rotating element, the cam of revolution being axially movable, so that the angle of engagement between the cam and the abutment surface is always equal to zero for all axial positions of the cam.

2. A measuring instrument in which the rectiliner movement of a feeler rod is transmitted to a geared multiplier mechanism by means of a rotating element such as an arm carrying a toothed sector meshing with a first toothed wheel of the multiplier mechanism, comprising:
   a. an abutment mounted on said feeler rod, said abutment having a bearing surface permanently perpendicular to the axis of the feeler rod;
   b. a support coaxial to said rotating element, said support rigidly fixed to said rotating element; and
   c. a cam of revolution mounted on said support and bearing against said bearing surface of said abutment, said cam of revolution having a longitudinal profile formed by an involute of circle, said cam of revolution having its longitudinal axis perpendicular to the axis of rotation of said rotating element, and furthermore said cam of revolution being axially movable on said support, whereby the angle of engagement between said cam of revolution and said bearing surface of said abutment is equal to zero and remains equal to zero whatever the axial position of said cam of revolution.

3. A measuring instrument according to claim 2, wherein said cam of revolution has a coaxial threaded base, which base engages said support perpendicularly to the axis thereof.

4. A measuring instrument according to claim 2, wherein said cam of revolution has a coaxial base, which base slides in said support perpendicularly to the axis thereof.

* * * * *